United States Patent [19]

Lehmann

[11] Patent Number: 4,611,698
[45] Date of Patent: Sep. 16, 1986

[54] SWITCH MECHANISM FOR SEQUENTIAL ACTION OF A DOUBLE CLUTCH MECHANISM

[75] Inventor: Ulrich Lehmann, Weissach, Fed. Rep. of Germany

[73] Assignee: Dr.Ing. h.c.F. Porsche Aktiengesellschaft, Fed. Rep. of Germany

[21] Appl. No.: 546,179

[22] Filed: Oct. 27, 1983

[30] Foreign Application Priority Data

Oct. 28, 1982 [DE] Fed. Rep. of Germany ....... 3239927

[51] Int. Cl.[4] .................. F16D 25/11; G01L 9/10
[52] U.S. Cl. ....................... 192/30 W; 192/48.9; 192/87.14; 192/87.18; 73/722
[58] Field of Search ............. 192/3.57, 30 W, 48.9, 192/87.14, 87.18, 103 F; 73/722, 745

[56] References Cited

U.S. PATENT DOCUMENTS

| | | | |
|---|---|---|---|
| 2,946,241 | 7/1960 | Snyder | 192/87.18 X |
| 3,324,727 | 6/1967 | Smith et al. | 73/722 |
| 3,656,348 | 4/1972 | Bertrand | 73/722 X |
| 3,720,108 | 3/1973 | Freitag | 73/722 |
| 3,967,504 | 7/1976 | Akeley | 73/722 |
| 3,995,493 | 12/1976 | Nishihara | 73/722 X |
| 4,057,132 | 11/1977 | Hattori et al. | 192/103 F X |
| 4,123,945 | 11/1978 | Bergstrand | 73/722 |
| 4,219,109 | 8/1980 | Ushijima et al. | 192/87.18 X |
| 4,340,133 | 7/1982 | Blersch | 192/30 W |
| 4,380,278 | 4/1983 | Lasken | 192/87.18 X |

Primary Examiner—Rodney H. Bonck
Assistant Examiner—Richard M. Lorence
Attorney, Agent, or Firm—Craig & Burns

[57] ABSTRACT

In a double clutch transmission, especially for a motor vehicle, it is necessary for the completely satisfactory shifting sequence to engage and disengage the clutches alternately; in order that such a sequence is assured, differential pressure switches are provided which include a signalling device that indicates end positions of the clutches to an electronic control installation for evaluation purposes.

16 Claims, 3 Drawing Figures

SWITCH MECHANISM FOR SEQUENTIAL ACTION OF A DOUBLE CLUTCH MECHANISM

The present invention relates to an installation for the control of a sequential actuation for a hydraulically actuated double clutch of a motor vehicle change-speed transmission adapted to be load-shifted.

In a semi-automatic change-speed transmission with speed preselection, which is constructed with a double clutch, a device indicating the position of the clutches is necessary for the accurate functioning of the shifting sequence in order to ascertain the position of the clutches before and after each shifting operation so that subsequent shifting operations can be initiated.

It is the task of the present invention to provide a differential pressure switch of the aforementioned type which permits during operation a conclusion as to the position of the clutches.

The underlying problems are solved according to the present invention in that for achieving the sequential actuation of the clutches, a differential pressure switch is provided for the shifting of a speed coordinated to the respective clutch, which includes an operating piston acted upon by the control pressure of the clutches, whereby the operating piston influences a measuring element of a signalling device in dependence on an end position of the clutch.

The advantages principally attained with the present invention reside in that by the indication of the end positions of the two clutches by way of the measuring element adapted to be influenced by the operating piston, a good functioning of the clutch system and, resulting therefrom, a completely satisfactory shifting sequence is assured. The construction of the differential pressure switch takes place by means of a sensor operating contactlessly, as, for example, by means of a conventional field plate-differential-sensor which produces an output signal for the recognition of the clutch positions after a contactless approach of a shifting piston displaceably by increased pressure. This measuring element is wear-free and far-reachingly independent of temperature so that a high operating safety is assured together with a considerable service life.

An immediate signal output furthermore results in that the shifting piston has to be displaced only through a small stroke up to the measuring element in case of a pressure difference between its two chambers.

According to a further feature of the present invention, the end faces of the pistons are matched to the prevailing pressure conditions, which means the areas do not possess in every case the same size.

By the cooperation of the measuring element of the signalling device and the shifting piston with smallest piston travel, the accurately matched clutch change which is required in double-clutch transmissions, can be realized without leading to an overlapping of the clutch actuation impairing the change in speed.

These and other objects, features and advantages of the present invention will become more apparent from the following description, when taken in connection with the accompanying drawing which shows, for purposes of illustration only, two embodiments in accordance with the present invention, and wherein.

Figure 1:
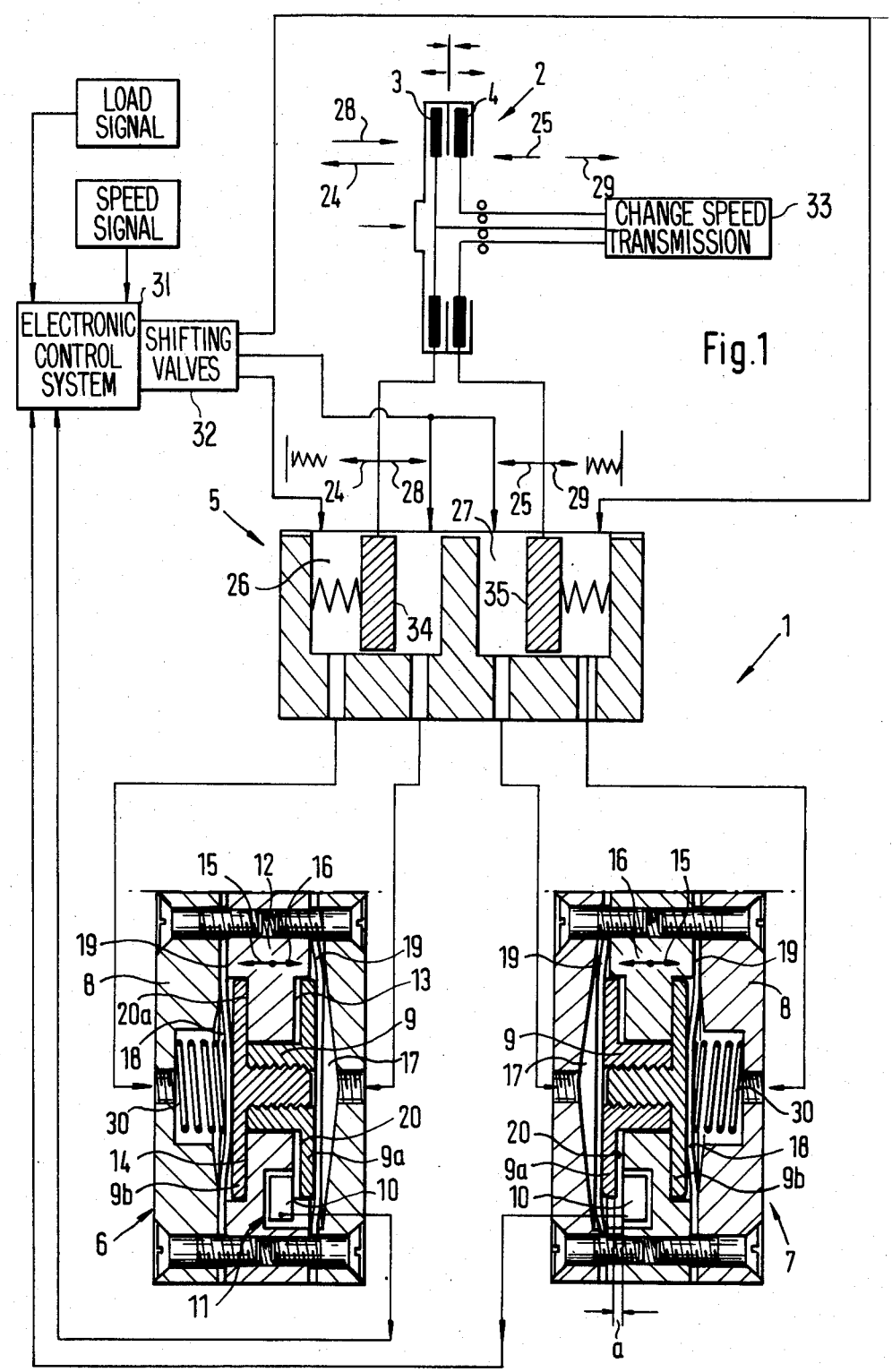
FIG. 1 is a somewhat schematic cross-sectional view of a differential pressure switch consisting of two units with its connecting lines to the double clutch in accordance with the present invention.

Referring now to the drawing wherein like reference numerals are used throughout the various views to designate like parts, and more particularly to FIG. 1, this figure illustrates a signalling system generally designated by reference numeral 1 for a double clutch generally designated by reference numeral 2 of an automatic motor vehicle change-speed transmission 33 of any conventional construction. In this figure, only the essential parts and connections are shown and more particularly the double clutch 2 consisting of two clutches 3 and 4, a schematically illustrated hydraulic pressure system generally designated by reference numeral 5 has two pistons 34 and 35 moveable either to directly engage either clutch 3 or 4, moveable directly to cause other parts of a fluid system to engage the clutches or moveable by the fluid pressures that are utilized to engage the clutches and two differential pressure switches generally designated by reference numerals 6 and 7 combined into one unit. An electronic control system 31 for the evaluation of the signals produced by the differential pressure switch as well as shifting valves 32 connected with the system are not illustrated in detail in the drawing for the sake of simplicity since they are of otherwise conventional construction.

The shifting in a motor vehicle change-speed transmission with a double clutch 2 takes place by way of an electronic speed selection so that no shifting takes place by way of a customary shifting lever. The clutches 3 and 4 operate automatically in such a manner that for the engagement of the speeds, the clutches 3 and 4 engage alternately, i.e., for the engagement of a first speed, for example, the clutch 3 is engaged whereas the clutch 4 is then disengaged. For the engagement of a second speed, a clutch change then takes place in such a manner that the clutch 4 engages and the clutch 3 is disengaged.

Figure 3:
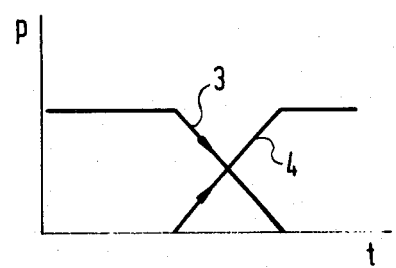
FIG. 3 is a diagram illustrating the pressure curve during the clutch change.

The manner of operation of the two clutches 3 and 4 as a function of time is illustrated in the pressure diagram of FIG. 3. Whereas, for example, the pressure at the clutch 3 drops off and the latter disengages, the pressure at the clutch 4 increases at the same time and engages the same. This operation repeats itself as a function of engine rotational speed.

In order that this sequential actuation of the two clutches 3 and 4 is matched accurately to one another, differential pressure switches 6 and 7 are interconnected into the hydraulic circulatory system of the clutches 3 and 4. These differential pressure switches 6 and 7 produce in one end position; that is, in an engaged position of the clutch, a signal that is evaluated by the electronic control system in such a manner that the clutches 3 and 4 assume their predetermined positions. The output signal is fed by the electronic control system to the shifting valves connected ahead of the clutches which then initiate a clutch change.

One differential pressure switch is coordinated to each clutch 3 and 4. The switch 6 is coordinated to the clutch 3 and the switch 7 is coordinated to the clutch 4. The two differential pressure switches 6 and 7 are preferably combined into a compact unit within a common housing 8. In FIG. 1, the unit is subdivided for reasons of ease of viewing, whereby the separating line is illustrated in dash and dotted lines.

The differential pressure switches 6 and 7 each include within the housing 8 a shifting piston 9 and a signalling device generally designated by reference numeral 11 which includes a measuring element 10. The shifting piston 9 is guided in a housing core 12 which simultaneously forms abutments 13 and 14 for the axial movements in the directions of the arrows 15 and 16. Two pressure chambers 17 and 18 are provided in the housing 8 which are connected with each other pressure-dependent by way of the switching piston 9. A sealed closure with respect to the piston 9 takes place in each case by way of an elastic diaphragm 19 of rubber, metal or any other elastic material. Each shifting piston 9 is provided with a head portion 9a and 9b stepped off with respect to the piston core, whereby the head portion 9a includes an inner annular surface 20 which is disposed facing the measuring element 10 and operable to influence the same. The measuring element 10 is formed, for example, of a magnetic field-plate differential sensor of conventional construction which consists of two magnetic field plates arranged adjacent one another that are electronically connected as bridge circuit.

Figure 2:
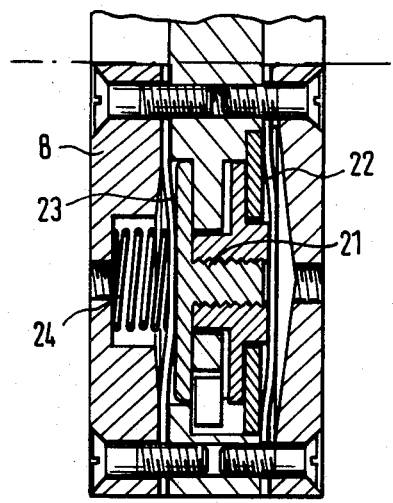
FIG. 2 is a partial cross-sectional view through a modified embodiment of a unit of a differential pressure switch in accordance with the present invention having differing pressure surfaces.

In the embodiment according to FIG. 1, the shifting pistons 9 include at the end face thereof one head portion 9a and 9b each with end surfaces of identical size which face the pressure space 17 and 18, respectively. The further embodiment according to FIG. 2 includes shifting pistons 21 which are provided with end faces 22 and 23 of different sizes corresponding to the prevailing pressure conditions.

In the pressureless condition, the shifting piston 9 of each differential pressure switch assumes the position illustrated in FIG. 1 by the action of a spring element 30. The annular surface 20 of the head portion 9a of each differential pressure switch 6 and 7 faces the corresponding measuring element 10 at a distance a. The further annular surfaces 20a of the opposite head portion 9b of each differential pressure switch 6 and 7, in contrast thereto, abuts at the housing core 12. During the engagement of the clutch 3 in the direction of arrow 28, the clutch 4 is simultaneously disengaged in the direction of arrow 29. By way of the pressure system 5 connected to the hydraulic circulation of the clutches, the chamber 18 of the differential pressure switch 6 is acted upon with pressure by way of the pressure space 26 of the shifting piston 9 and assumes the position illustrated in FIG. 1.

At the same time, the further piston 9 in the differential pressure switch 7 is acted upon by way of the pressure space 27 of the pressure system 5. The piston 9 of the differential pressure switch 7 is displaced in the direction of arrow 15 by an amount <0.5 mm. and its annular surface 20 covers a magnetic field plate of the measuring element 10 whereby a maximum mismatch of the element and a signal output is achieved. The signal output takes place preferably contactlessly with respect to the measuring element 10 and is thus essentially wear-free.

During a further shifting operation, the clutch 3 is disengaged in the direction of arrow 24 and in the exchange, the clutch 4 is engaged in the direction of arrow 25. The end position of the disengaged clutch is indicated in each case by a signal and is registered by the electronic circuit of the clutch control which may be of any conventional construction and is therefore not illustrated in detail. However, according to the present invention, an indication of the positions with an engaged clutch by way of the measuring element 10 is also possible.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An installation for controlling a sequential actuation for a hydraulically actuated double clutch having two clutch means of a motor vehicle change-speed transmission, characterized in that a differential pressure switch means is provided for the installation to be utilized in the sequential actuating of the clutch means of the double clutch for the engagement of a speed coordinated to the respective clutch means, said differential pressure switch means including a shifting piston means moveable in two directions, having plural end face portion means acted upon by the control pressure of the clutch means and being limited in its shifting in both directions by stop portions of a piston housing means surrounding the piston means between two end portions, said stop portions being located between the two end portions, said shifting piston means being operable at one of its two end positions to influence a measuring element of a signalling means in dependence on an end position of the respective clutch means.

2. An installation according to claim 1, characterized in that one differential pressure switch means is coordinated to each clutch means, each differential pressure switch means including two pressure chamber means connected by way of an axially movable shifting piston means, and the pressure chamber means being in operative communication with a hydraulic control circuit of the clutch means.

3. An installation according to claim 2, characterized in that each pressure chamber means is sealed off with respect to the shifting piston means by way of an elastic diaphragm transmitting pressure.

4. An installation according to claim 3, characterized in that the diaphragm consists of rubber-like material.

5. An installation according to claim 2, characterized in that the shifting piston means includes at each end face portion means one piston head, at least one piston head being provided with an inner annular surface which, with a disengaged position of the clutch means, is disposed opposite the measuring element at a predetermined distance and with an engaged position of the clutch means, approaches the measuring element but remains without contact for producing a signal.

6. An installation according to claim 5, characterized in that the inner annular surface of said one head of the shifting piston means, in the pressureless condition, is in a position at a predetermined distance to the measuring element by the action of a spring element and an inner annular surface of the other head of the shifting piston means limits the shifting by abutting the housing means.

7. An installation according to claim 6, characterized in that the predetermined distance between the measuring element of the signalling means and the inner annular surface of the one piston head is smaller than 0.5 mm.

8. An installation according to claim 7, characterized in that the measuring element is a field plate differential sensor means.

9. An installation according to claim 7, characterized in that the end face portion means of a respective shifting piston means are of the same size.

10. An installation according to claim 7, characterized in that the end face portion means of a respective shifting piston means are of different sizes.

11. An installation according to claim 1, characterized in that the shifting piston means includes at each end face portion means one piston head, at least one piston head being provided with an inner annular surface which, in one condition of the corresponding clutch means consisting of the engaged and disengaged conditions, is disposed opposite the measuring element at a predetermined distance and in the other condition of the corresponding clutch means approaches the measuring element but remains without contact for producing a signal.

12. An installation according to claim 11, characterized in that the inner annular surface of said one head of the shifting piston means, in the pressureless condition, is in a position at a predetermined distance to the measuring element by the action of a spring element and an inner annular surface of the other head of the shifting piston means limits the shifting by abutting the housing means.

13. An installation according to claim 11, characterized in that the predetermined distance between the measuring element of the signalling means and the inner annular surface of the one piston head is smaller than 0.5 mm.

14. An installation according to claim 1, characterized in that the measuring element is a field plate differential sensor means.

15. An installation according to claim 1, characterized in that the end face portion means of a respective shifting piston means are of the same size.

16. An installation according to claim 1, characterized in that the end face portion means of a respective shifting piston means are of different sizes.

* * * * *